(No Model.) 2 Sheets—Sheet 1.
E. A. SPERRY.
ELECTRIC MOTOR AND REGULATOR THEREFOR.
No. 420,117. Patented Jan. 28, 1890.
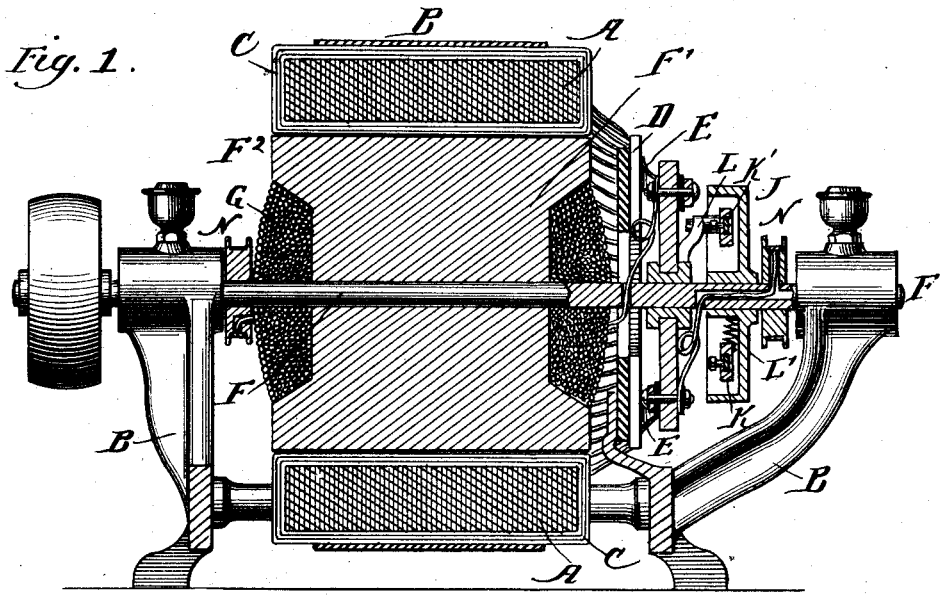
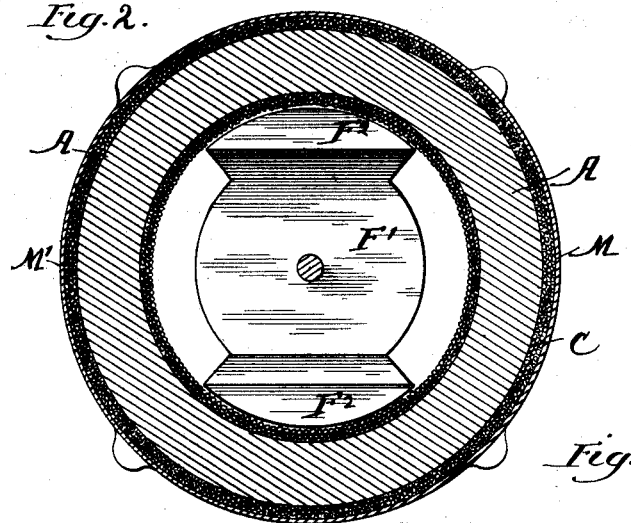
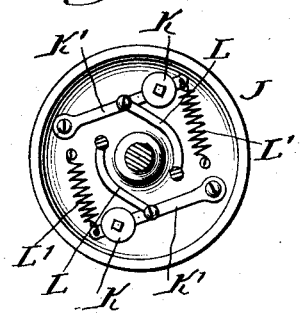
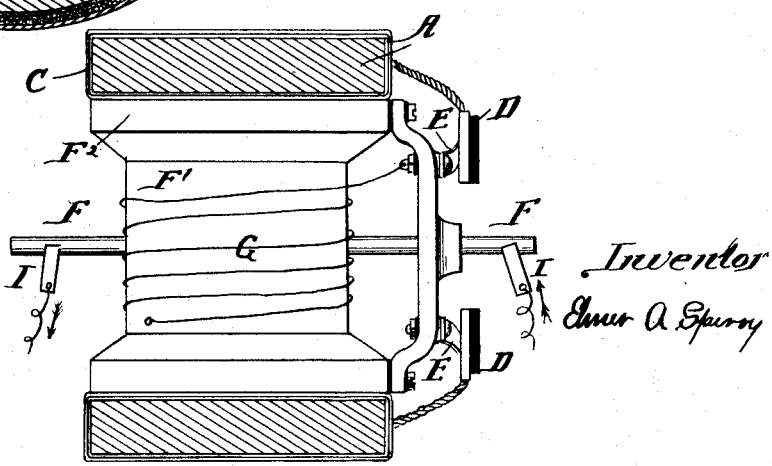
Witnesses:
O. W. Bond
H. P. Hallock
Inventor
Elmer A. Sperry (No Model.) 2 Sheets—Sheet 2.

E. A. SPERRY.
ELECTRIC MOTOR AND REGULATOR THEREFOR.

No. 420,117. Patented Jan. 28, 1890.

Witnesses:
O. W. Bond
H. B. Hallock

Inventor:
Elmer A. Sperry

UNITED STATES PATENT OFFICE.

ELMER A. SPERRY, OF CHICAGO, ILLINOIS.

ELECTRIC MOTOR AND REGULATOR THEREFOR.

SPECIFICATION forming part of Letters Patent No. 420,117, dated January 28, 1890.

Application filed December 7, 1888. Serial No. 292,891. (No model.)

*To all whom it may concern:*

Be it known that I, ELMER A. SPERRY, a citizen of the United States, residing at Chicago, county of Cook, State of Illinois, have invented certain new and useful Improvements in Electric Motors, of which the following is a clear and accurate specification, such as will enable those conversant with the art to manufacture and operate the same.

My invention relates to electric motors, and has for its object simplification and cheapening as to manufacture and improving as to efficiency. In a very useful class of motors it is desirable to actuate stationary governing devices by centrifugal force, which has greatly limited the application of this form of motor, for reason that the motion has to be transmitted through intricate and costly mechanism, numerous joints attended by wasteful friction from the highly-revolving parts to the stationary portions to be governed. In the present invention these objections are overcome by causing the governed to rotate with the governor, admitting of the two being combined in one device and with a new and highly-efficient form of motor.

Figure 5:
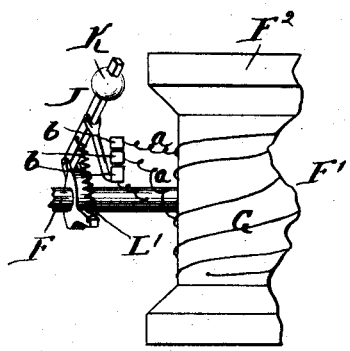
Figure 6:
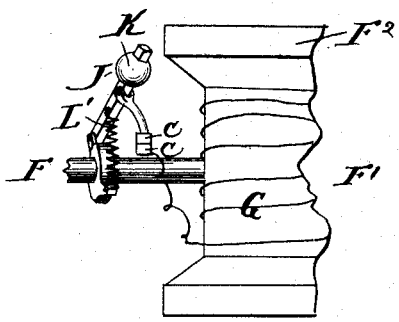
Figure 7:
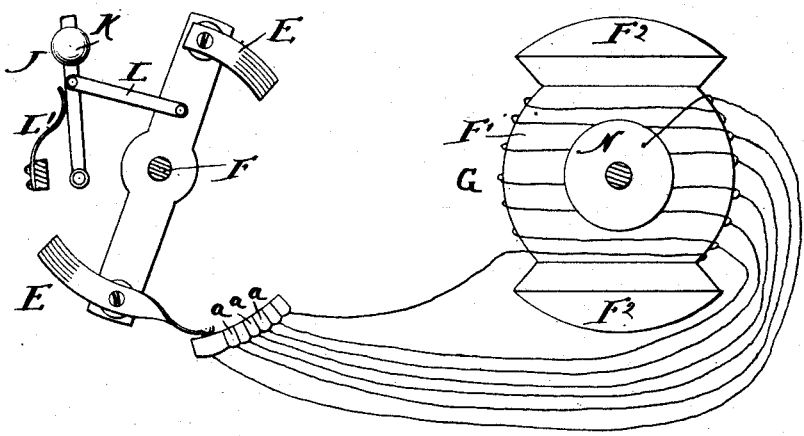

In the drawings, Figure 1 represents a longitudinal section of a motor and governor. Fig. 2 represents a transverse section through the armature, showing field-magnet unwound of Fig. 1. Fig. 3 represents a view of a portion of Fig. 1. Fig. 4 is a longitudinal section of a portion of a motor, and also a diagrammatic view of the arrangement of circuits. Figs. 5, 6, and 7 show diagrams of the circuit-connections, and also of the connections with the governing devices.

Similar letters of reference indicate like parts.

An annular armature A is mounted within any frame-work, as B. The coils C upon the armature are connected to any suitable commutator, as D. Contacts E E are provided, which revolve with the shaft, but may be capable of any desired angular position about the shaft F.

F' indicates a revolving field-magnet located interior to the armature. The core or body upon which the conductors are wound may be curved accurately to conform with the interior surface of the armature—that is, the recess which is provided for the winding of the wire shall form a segmental annular recess, allowing the exterior of the windings to conform to the interior circle or surface of the armature. Extensions $F^2$ may be more or less than one-quarter the circumference. The windings G are disposed in these segmental annular recesses upon the field-magnet, as shown. At the center is a shaft forming gudgeons F F, upon which the field-magnet F' rests and rotates. The final terminals of the field-magnet coils are provided with brushes, contacts, or the like I, which serve to establish the proper circuit relation and insure contact when the revolving parts, gudgeons, journals, &c., are used to form a portion of electrical circuit, as in Fig. 4. The iron of the field-magnets and armature may be either solid or laminated.

Intermediate terminals of the field-coils, as $a\,a$, Figs. 5 and 7, may be provided. Their office will now be described. A centrifugal device J is mounted upon the shaft of the motor and revolves therewith. This is shown in Figs. 1, 3, 5, 6, and 7. The purpose of this governor is for effecting the speed of the motor.

In Fig. 3, K indicates the centrifugal weights. K' indicates the levers upon which these weights are mounted.

L indicates the link by which the motion is transferred to the governed element.

L' indicates the centripetal element of the governor.

In Fig. 1 the commutator-contacts are so mounted that their position may be changed about the shaft and with reference to the position of the pole-pieces $F^2$ of the field-magnet, and so coupled with the governor J as to be moved thereby.

In Fig. 5 the centrifugal device J affects contacts $b\,b$, which are intermediate terminals or terminals of the sections of the field-magnet windings, the lower contact $b$ being placed in permanent connection with the final terminal of the field-magnet or the same conductor to which said terminal is connected.

In Fig. 6 the contacts $c\,c$ are controlled by the centrifugal device J, which forms a path for the main current of the motor.

In Fig. 7 the centrifugal governor J affects both the contacts $a\,a$, which form the intermediate terminals of the field, and at the same time the commutator-contacts E E. As is well known, the manipulation of the commutator-contacts upon the commutator changes the intensity of the rotative action or effort between the armature and the field-magnet. Another means of varying this intensity is by varying the induction in the field-magnet by cutting out or shunting all or portions of its coils from circuit. The various means I have shown I shall therefore refer to generally as means of varying the intensity of effort between the armature and the field.

The operation of the device is simple, and is substantially as follows: Referring now to Fig. 2, the current is led upon the armature in such a manner as to make an intense pole at M, the opposite pole being at M'. The two poles of the field-magnet will be at $F^2$ and $F^2$, the mean position of which is at ninety degrees from the position of the poles in the armature. The well-known repellent and attractive force is thus exerted in a maximum degree, and tends to rotate the field-magnet in one direction or the other, dependent upon the respective polarities. The commutator-contacts being capable of rotation about the shaft, the effort of this rotation can be changed by changing the angle at which they contact with the commutator-sections, and therefore the angle at which the polarities of the field-magnet and armature work. The centrifugal governor J operates through the links L in the usual manner to affect the rotation of the commutator-contacts E E. In Fig. 6, as the speed increases, the contact $c\,c$, through which the main current passes, is broken. All effort will cease in the motor except that of stored momentum. When sufficient of this is expended, the spring L' will draw down the lever and the contacts will again close, current will flow, and the motor will again renew its work. In Fig. 5 the action is opposite, and as the governor-ball K is thrown from the center by the acceleration of the speed a shunt is closed about successive portions of the field-magnet until the effort is sufficiently reduced to exactly meet the requirements. In Fig. 7 devices are shown whereby the first and the last of these two governing principles are employed in combination, as will readily be seen. N is an additional commutator or rotating contact, whereby the current is led to and from the revolving parts without employing the journals. This is also shown in Fig. 1.

In this specification the term "armature" is employed to indicate that particular part upon which the coils of wire are wound, the terminals of which coils are coupled to the segments of the commutator, and the term "field" indicates that part of the machine in which the coils are coupled continuously in circuit, the direction of the polarity being constant with regard to the mass. This field-magnet I revolve upon the shaft, as shown.

What I claim as novel, and desire to secure by Letters Patent, is—

1. In a motor, a revolving field-magnet the terminals of which are connected to contacts, in combination with a movable contact operating in conjunction therewith and a centrifugal device which affects the movement of said contact-maker, all of which revolves with said field-magnet.

2. In an electric motor, a revolving field-magnet the terminals of which are secured to contact-plates, and a movable contact-maker adapted to operate in conjunction with said plates, in combination with a lever and weight controlling said contact-maker, and a spring adapted to co-operate with said lever and weight, all of which revolves with said field-magnet.

3. In an electric motor, a core to receive the windings, consisting substantially of a Siemens bobbin with a cross-piece bulged out to form cylindrical surfaces concentric with the axis of the bobbin, and means whereby said bobbin is rotated about such axis, in combination with a coil or coils of wire wound upon such cylindrical surfaces, and contacts secured to the terminals of such coil or coils, and a co-operating contact which revolves with such core and coils, and a centrifugal device operating said co-operating contacts, said co-operating contact mounted upon a lever provided with a weight and spring, an annular armature interior to which the revolving core is disposed, the coils of which are coupled to the commutator plates or sections, and revolving brushes for said commutator, which are mounted upon the axis of the revolving core aforesaid.

ELMER A. SPERRY.

Witnesses:
O. W. BOND,
B. McDEVITT.